US006807484B2

United States Patent
Inoue et al.

(10) Patent No.: US 6,807,484 B2
(45) Date of Patent: Oct. 19, 2004

(54) NAVIGATION SYSTEM, HAND-HELD TERMINAL, DATA TRANSFER SYSTEM AND PROGRAMS EXECUTED THEREIN

(75) Inventors: Akira Inoue, Ama-gun (JP); Toru Yamazaki, Chita (JP); Kazuyoshi Azuma, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/112,595

(22) Filed: Mar. 27, 2002

(65) Prior Publication Data

US 2002/0169551 A1 Nov. 14, 2002

(30) Foreign Application Priority Data

Mar. 29, 2001 (JP) ........................................ 2001-095831
Jan. 25, 2002 (JP) ........................................ 2002-016897

(51) Int. Cl.⁷ ............................................. G01C 21/34
(52) U.S. Cl. ..................... 701/213; 340/995.1; 701/214
(58) Field of Search ................................. 701/213, 208, 701/209, 214, 207; 340/988, 990, 995, 995.1; 455/403, 414, 456, 457

(56) References Cited

U.S. PATENT DOCUMENTS

| 5,797,091 A | * | 8/1998 | Clise et al. ............... 455/404.2 |
| 6,289,279 B1 | | 9/2001 | Ito et al. |
| 6,314,369 B1 | * | 11/2001 | Ito et al. ..................... 701/209 |
| 6,510,381 B2 | * | 1/2003 | Grounds et al. ............ 701/207 |
| 6,553,308 B1 | * | 4/2003 | Uhlmann et al. ........... 701/208 |
| 2002/0197955 A1 | * | 12/2002 | Witkowski et al. ........... 455/41 |

FOREIGN PATENT DOCUMENTS

| JP | 7-253327 | 10/1995 |
| JP | 9-81885 | 3/1997 |
| JP | 9-184878 | 7/1997 |
| JP | 11-337346 | 12/1999 |
| JP | 2000-315296 | 11/2000 |

OTHER PUBLICATIONS

Office Action dated Jan. 7, 2004 in corresponding JP Application No. 2002-016897 with English translation.

* cited by examiner

Primary Examiner—Marthe Y. Marc-Coleman
(74) Attorney, Agent, or Firm—Harness, Dickey & Pierce, PLC (57) ABSTRACT

When there is no continuity between a current position data acquired by the car navigation system and a previous position data acquired by the car navigation system, the car navigation system determines a current position of a vehicle based on position data transmitted from a personal digital assistant (PDA). In this way, the current position of the vehicle can be determined immediately.

12 Claims, 11 Drawing Sheets

NAVIGATION SYSTEM, HAND-HELD TERMINAL, DATA TRANSFER SYSTEM AND PROGRAMS EXECUTED THEREIN

CROSS REFERENCE TO RELATED APPLICATION

This application is based on and incorporates herein by reference Japanese Patent Application No. 2001-95831 filed on Mar. 29, 2001 and Japanese Patent Application No. 2002-16897 filed on Jan. 25, 2002.

BACKGROUND OF THE INVENTION

1. Field of the Invention

The present invention relates to a navigation system, a hand-held terminal and a data transfer system, which includes the navigation system and the hand-held terminal. The present invention also relates to a program executed in the navigation system and a program executed in the hand-held terminal.

2. Description of Related Art

In general, a navigation system installed, for example, in a vehicle includes a global positioning system (GPS) receiver. The GPS receiver receives GPS signals transmitted from GPS satellites. The navigation system acquires position data by processing the GPS signals received from the GPS satellites through the GPS receiver. Then, the navigation system determines a current position of the vehicle based on the acquired position data.

In such a navigation system, each set of the position data acquired through the GPS receiver is stored in a non-volatile memory one after another. For example, when the vehicle is parked in a parking lot, and thus an ignition switch is turned off, electric power is no longer supplied from a vehicle battery to the navigation system. Thereafter, when the ignition switch is turned on to drive the vehicle out of the parking lot, the electric power is supplied to the navigation system from the vehicle battery. At this moment, the latest position data stored in the non-volatile memory (i.e., the latest position data acquired before the turning off of the ignition switch) is retrieved from the non-volatile memory. Then, the current position of the vehicle is determined based on the retrieved position data.

Figure 12A:
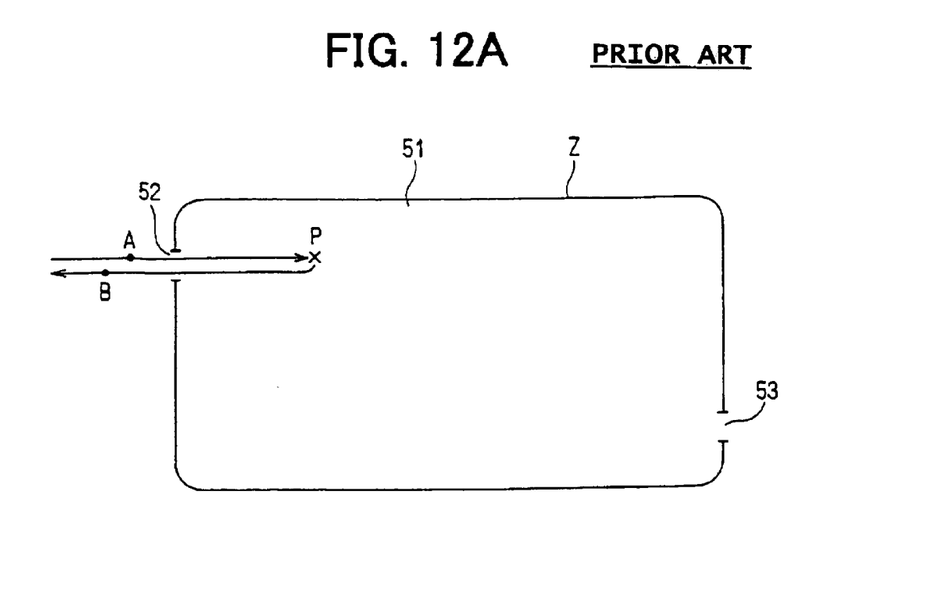
FIG. 12A is a schematic exemplary diagram showing a driving path of a vehicle in and around a parking lot.
Figure 12B:
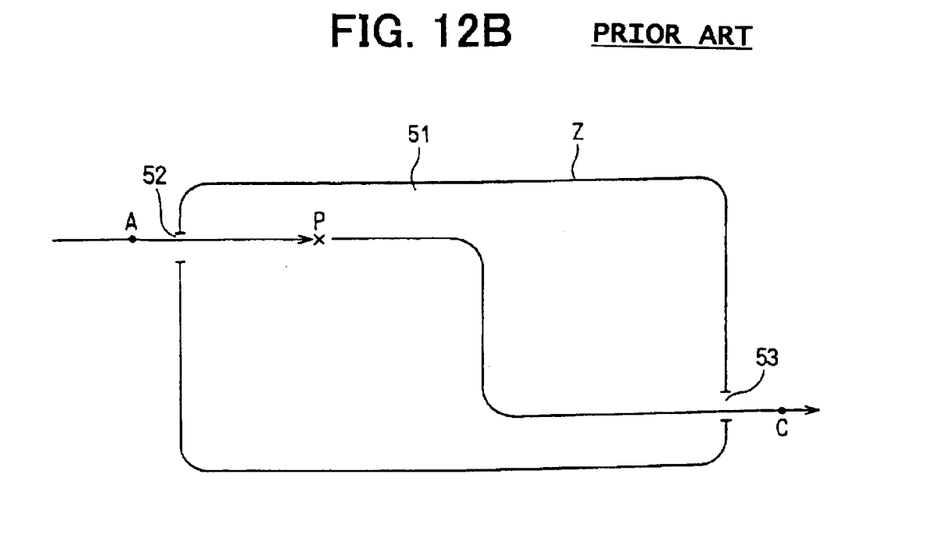
FIG. 12B is a schematic exemplary diagram similar to FIG. 12A showing another driving path of the vehicle in and around the parking lot.

However, such a navigation system may have the following disadvantage. FIGS. 12A and 12B show two exemplary cases. In both cases, a vehicle is parked at a parking lot 51 (indicated with a solid line Z in FIGS. 12A and 12B) under a poor radio environment (e.g., basement parking lot or parking lot located inside a building) where the effective GPS signals cannot be received from the GPS satellites. With reference to the case shown in FIG. 12A, the vehicle enters the parking lot 51 through a parking lot entrance 52 and is then parked at a point P. Thereafter, the vehicle is driven from the point P and exits the parking lot 51 through the same entrance 52. In this case, first position data (first set of the position data), which is acquired before the turning off of the power supply to the navigation system at the point P, is the position data of a point A in FIG. 12A. Furthermore, second position data (second set of the position data), which is acquired first after the turning on of the power supply to the navigation system at the point P, is the position data of a point B in FIG. 12. In such a situation, a distance between the point A and the point B is relatively short. In other words, there is continuity between the first position data, which is acquired before the turning off of the power supply to the navigation system at the point P, and the second position data, which is acquired after the turning on of the power supply to the navigation system at the point P. Thus, the current position of the vehicle can be immediately determined.

However, this is different in the case shown in FIG. 12B where the vehicle, which has been parked at the point P after entering the parking lot 51 through the entrance 52, is driven and exits the parking lot 51 through another entrance 53, which is relatively far from the entrance 52. In this case, similar to the above case, the first position data (first set of the position data), which is acquired before the turning off of the power supply to the navigation system at the point P, is the position data of the point A in FIG. 12B. Furthermore, second position data (second set of the position data), which is acquired first after the turning on of the power supply to the navigation system at the point P, is the position data of a point C in FIG. 12B. In this case, since a distance between the point A and the point C is relatively long, there is no continuity between the first position data, which is acquired before the turning off of the power supply to the navigation system at the point P, and the second position data, which is acquired after the turning on of the power supply to the navigation system at the point P. In such a case, it is difficult to determine the current position of the vehicle immediately. Thus, a substantial amount of time is required before the current position of the vehicle can be determined, resulting in inconvenience to the users.

Apart from the above disadvantage, there is another disadvantage. That is, the navigation system is basically constructed such that the navigation system retrieves map data, which corresponds to position data acquired through its own GPS receiver, from the external storage medium, such as a compact disk-read only memory (CD-ROM), a digital versatile disk-read only memory (DVD-ROM) or a memory card. Then, the navigation system displays a map of the retrieved map data on its display. Thus, even if a hand-held terminal having a GPS receiver is available, and position data is acquired by the GPS receiver of the hand-held terminal, a map of map data, which corresponds to the position data acquired through the GPS receiver of the hand-held terminal, cannot be displayed on the display of the navigation system because the navigation system is not constructed to receive and process the position data from the hand-held terminal, resulting in further inconvenience to the users.

SUMMARY OF THE INVENTION

The present invention addresses the above disadvantages. Thus, it is an objective of the present invention to provide a navigation system, which allows immediate determination of a current position of a vehicle even when there is no continuity between two consecutive sets of position data acquired by the navigation system and also allows display of a map of map data corresponding to position data acquired by a hand-held terminal on a display of the navigation system, thereby improving usability of the navigation system. It is another objective of the present invention to provide a data transmission system, which allows immediate determination of a current position of a vehicle even when there is no continuity between two consecutive sets of position data acquired by a navigation system and also allows display of a map of map data corresponding to position data acquired by a hand-held terminal on a display of the navigation system, thereby improving usability of the navigation system. It is a further objective of the present invention to provide a hand-held terminal, which allows immediate determination of a current position of a vehicle even when there is no continuity between two consecutive sets of position data acquired by a navigation system and also allows display of a map of map data corresponding to position data acquired by the hand-held terminal on a display of the navigation system, thereby improving usability of the navigation system. It is a further objective of the present invention to provide a program, which allows immediate determination of a current position of a vehicle even when there is no continuity between two consecutive sets of position data acquired by a navigation system and also allows display of a map of map data corresponding to position data acquired by a hand-held terminal on a display of the navigation system, thereby improving usability of the navigation system.

To achieve the objectives of the present invention, there is provided a navigation system including a position data receiving means for receiving at least one set of position data from a hand-held terminal, and a control means. Each set of the position data indicates a position of the hand-held terminal. The control means executes at least one predetermined process based on the at least one set of the position data received by the position data receiving means.

To achieve the objectives of the present invention, there is also provided a data transfer system including a hand-held terminal and a navigation system. The hand-held terminal includes a position data acquiring means for acquiring at least one set of position data, a position data transmitting means for transmitting at least one of the at least one set of the position data acquired by the position data acquiring means, and a control means. Each set of the position data indicates a position of the hand-held terminal. The control means transmits the at least one of the at least one set of the position data acquired by the position data acquiring means from the position data transmitting means to the navigation system. The navigation system includes a position data receiving means for receiving the at least one of the at least one set of the position data from the hand-held terminal, and a control means. The control means executes at least one predetermined process based on the at least one of the at least one set of the position data received by the position data receiving means.

To achieve the objectives of the present invention, there is provided a hand-held terminal of a data transfer system. The data transfer system includes the hand-held terminal and a navigation system. The hand-held terminal includes a position data acquiring means for acquiring at least one set of position data, a position data transmitting means for transmitting at least one of the at least one set of the position data acquired by the position data acquiring means, a control means, a clocking means for clocking date and time, and a position data storage means. Each set of the position data indicates a position of the hand-held terminal. The control means transmits the at least one of the at least one set of the position data acquired by the position data acquiring means from the position data transmitting means to the navigation system. The position data storage means stores the at least one set of the position data acquired by the position data acquiring means. The control means stores each set of the position data, which is acquired by the position data acquiring means, in the position data storage means together with associated date and time of acquisition of each set of the position data clocked by the clocking means. When the associated date and time of one of the at least one set of the position data are specified by a user, the control means transmits the corresponding set of the position data from the position data transmitting means to the navigation system.

To achieve the objectives of the present invention, there is provided a hand-held terminal of a data transfer system. The data transfer system includes the hand-held terminal and a navigation system. The hand-held terminal includes a position data acquiring means for acquiring at least one set of position data, a position data transmitting means for transmitting at least one of the at least one set of the position data acquired by the position data acquiring means, a control means, a character inputting means, and a position data storage means. Each set of the position data indicates a position of the hand-held terminal. The control means transmits the at least one of the at least one set of the position data acquired by the position data acquiring means from the position data transmitting means to the navigation system. Associated characters are inputted through the character inputting means for each set of the position data by a user. The position data storage means stores the at least one set of the position data acquired by the position data acquiring means. The control means stores each set of the position data, which is acquired by the position data acquiring means, in the position data storage means together with the associated characters of each set of the position data. When the associated characters of one of the at least one set of the position data are specified by the user, the control means transmits the corresponding set of the position data from the position data transmitting means to the navigation system.

To achieve the objectives of the present invention, there is provided a program executed in a navigation system. The program includes steps of receiving at least one set of position data from a hand-held terminal and determining a position of a vehicle based on the at least one set of the position data received from the hand-held terminal. Each set of the position data indicates a position of the hand-held terminal.

To achieve the objectives of the present invention, there is also provided a program executed in a navigation system. The program includes steps of receiving at least one set of position data from a hand-held terminal and displaying a map of map data, which corresponds to one of the at least one set of the position data received from the hand-held terminal. Each set of the position data indicates a position of the hand-held terminal.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION (First Embodiment)

A data transfer system, which includes a navigation system and a hand-held terminal, according to a first embodiment of the present invention will be described with reference to FIGS. 1 to 5.

Figure 1:
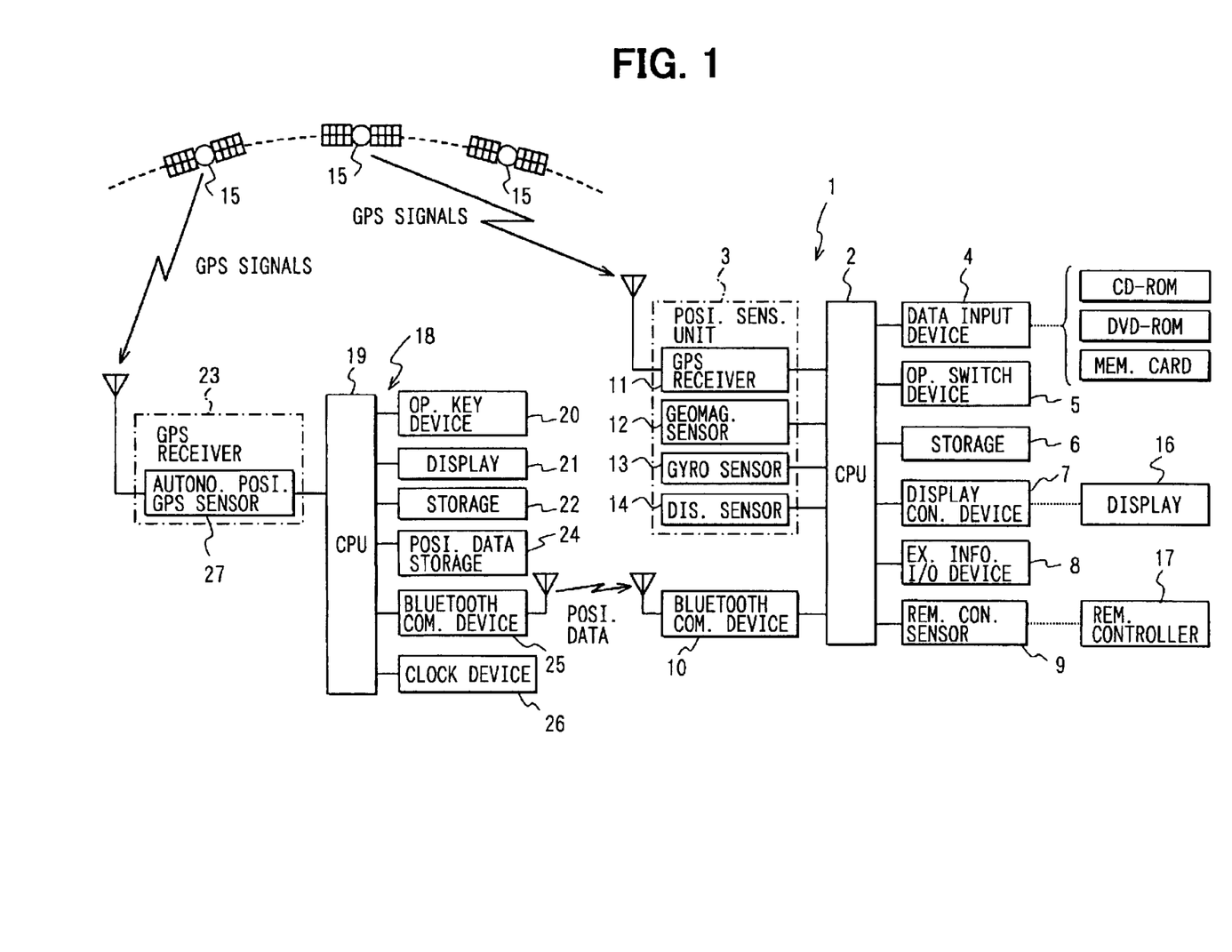
FIG. 1 is a functional block diagram showing a first embodiment of the present invention.

FIG. 1 is a functional block diagram showing electrical arrangements of the navigation system and of the hand-held terminal in a form of personal digital assistant (PDA). The car navigation system 1 has a central processing unit (CPU) 2 (control means), which includes a microcomputer. The CPU 2 is connected to a position sensing unit 3, a data input device 4, an operating switch device 5, a storage 6, a display control device 7, an external information input/output device 8, a remote control sensor 9 and a "Bluetooth" (Registered Trade Mark) communication device 10 (position data receiving means).

The position sensing unit 3 includes a global positioning system (GPS) receiver (position data acquiring means) 11, a geomagnetic sensor 12, a gyro sensor 13 and a distance sensor 14. The GPS receiver 11 acquires position data (also referred as a set of position data) by processing GPS signals transmitted from GPS satellites 15 and outputs the acquired position data to the CPU 2. The geomagnetic sensor 12 detects a vehicle orientation based on the earth magnetism and outputs orientation data indicative of the measured vehicle orientation to the CPU 2. The gyro sensor 13 measures an angular velocity and computes the vehicle orientation based on the measured angular velocity. Then, the gyro sensor 13 outputs the orientation data indicative of the computed vehicle orientation to the CPU 2. The distance sensor 14 measures a vehicle travel distance and outputs distance data indicative of the measured vehicle travel distance to the CPU 2.

The data input device 4 inputs various data, such as map data, map matching data, mark data and/or hyper text markup language (HTML) data, from an external storage medium, such as a compact disk-read only memory (CD-ROM), a digital versatile disk-read only memory (DVD-ROM) or a memory card. The operating switch device 5 is integrated, for example, in a display 16 (a display means). The operating switch device 5 detects operation of various switches by a user and outputs signals indicative of the switch operation to the CPU 2.

The storage 6 stores a control program (a program of the present invention), which is executed in the CPU 2. The CPU 2 retrieves and executes the control program stored in the storage 6 to carry out processes, which will be described in greater detail below. The storage 6 stores each set of position data acquired by the GPS receiver 11. The display control device 7 controls operation of the display 16. The external information input/output device 8 receives external information, such as vehicle information & communication system (VICS) information, and outputs various information. The remote control sensor 9 detects control signals transmitted from a remote controller 17 and outputs the detected signals to the CPU 2. The Bluetooth communication device 10 receives the position data from the PDA 18 and outputs the received position data to the CPU 2 upon establishment of a wireless communication link between the Bluetooth communication device 10 of the car navigation system 1 and the PDA 18.

The PDA 18 has a central processing unit (CPU) 19 (control means), which includes a microcomputer. The CPU 19 is connected to an operating key device (character inputting means) 20, a display (display means) 21, a storage 22, a GPS receiver (position data acquiring means) 23, a position data storage (position data storage means) 24, a Bluetooth communication device (position data transmitting means) 25 and a clock device 26 (clocking means). The operating key device 20 includes various mechanical keys, such as a "power" key, a "setting" key and a "release" key, and also includes various touch keys displayed on the display 21. The operating key device 20 detects activation of each key by the user and outputs an operating signal indicative of the activation of the key to the CPU 19. When a display command signal is received from the CPU 19, the display 21 displays information corresponding to the display command signal. The storage 22 stores a control program to be executed by the CPU 19. The CPU 19 retrieves the control program from the storage 22 and executes the control program to carry out processes, which will be described below in greater detail.

The GPS receiver 23 includes an autonomous positioning (also referred to as absolute positioning, point positioning or single receiver positioning) type GPS sensor 27 (autonomous positioning type GPS positioning means). The autonomous positioning type GPS sensor 27 can acquire the position data by itself. When the GPS signals are received by the GPS sensor 27 from the GPS satellites 15, the received GPS signals are processed to obtain position data. The position data storage 24 stores the position data acquired by the GPS receiver 23. The Bluetooth communication device 25 transmits the position data, which is acquired by the GPS receiver 23 and is stored in the position data storage 24, to the car navigation system 1 upon establishment of the wireless communication link between the Bluetooth communication device 25 of the PDA 18 and the Bluetooth communication device 10 of the car navigation system 1. The clock device 26 clocks date and time and outputs clock signals indicative of date and time to the CPU 19.

Operations of the above arrangements will be described with reference to FIGS. 2 to 5.

Figure 2:
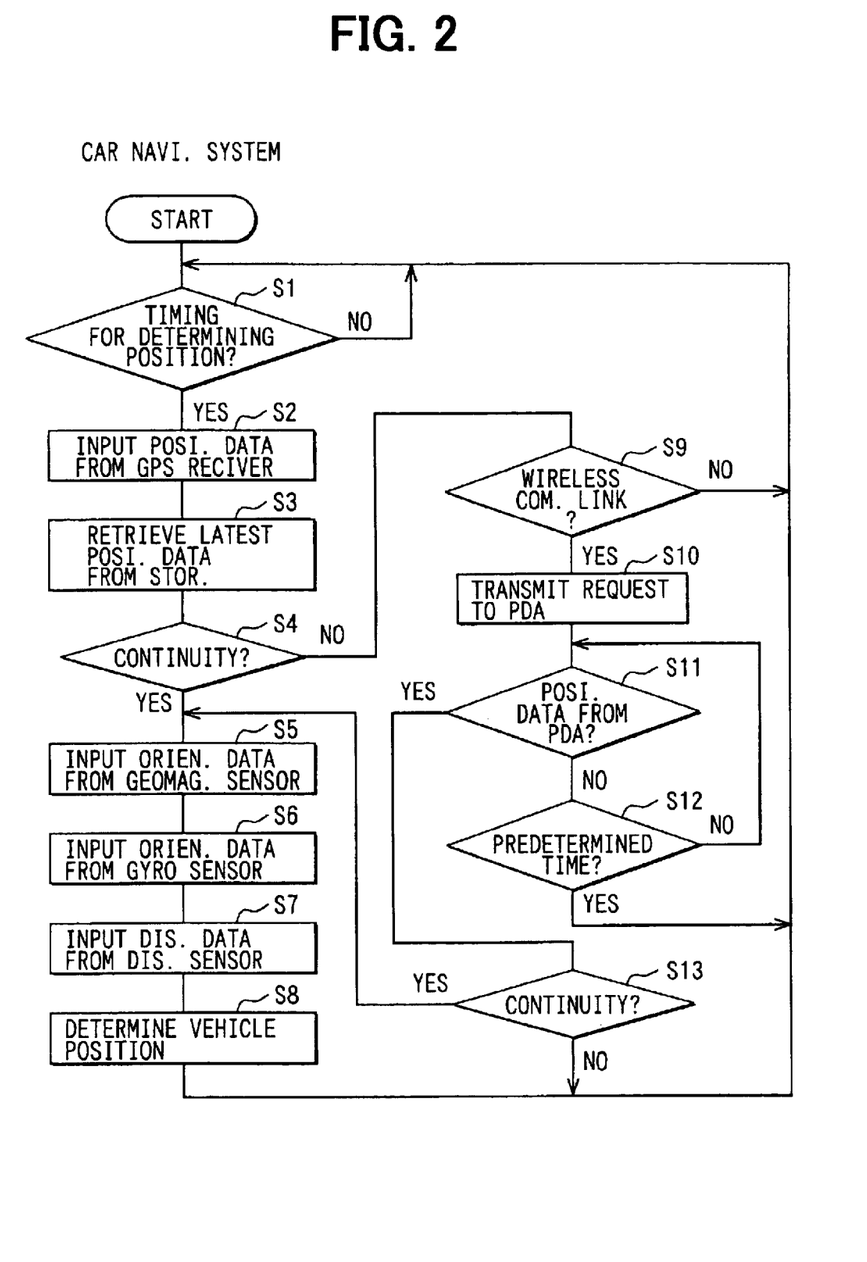
FIG. 2 is a flowchart showing a control operation of a car navigation system for determining a current vehicle position according to the first embodiment.
Figure 3:
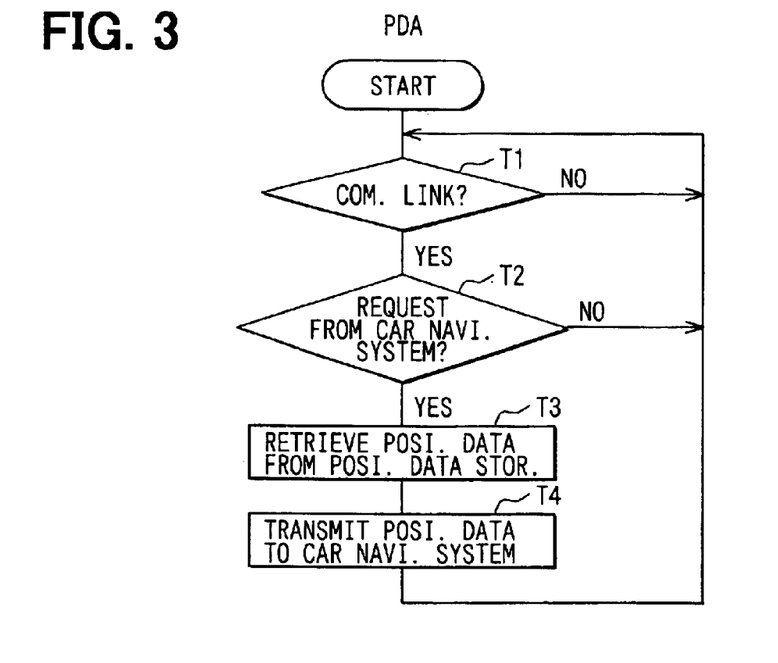
FIG. 3 is a flowchart showing a control operation of a personal digital assistant (PDA) for transmitting position data to the car navigation system according to the first embodiment.

First, a case where the car navigation system 1 carries out a process of determining a vehicle position based on the position data (one set of the position data) received from the PDA 18 will be described with reference to FIGS. 2 and 3. FIG. 2 shows a flowchart indicating a corresponding control operation of the car navigation system 1. FIG. 3 shows a flow chart indicating a corresponding control operation of the PDA 18.

In the car navigation system 1, the CPU 2 determines whether a predetermined timing for determining the vehicle position has been reached (step S1). When the CPU 2 detects that the predetermined timing has been reached ("YES" at step S1), the position data, which is acquired by the GPS receiver 11, is inputted to the CPU 2 from the GPS receiver 11 (step S2). The predetermined timing for determining the current vehicle position can be a point in time at which the vehicle travel distance reaches a predetermined distance.

Then, the CPU 2 retrieves the latest position data previously stored in the storage 6 (step S3). Thereafter, the CPU 2 determines whether there is continuity between the position data inputted from the GPS receiver 11 and the position data retrieved from the storage 6 (step S4). The continuity is determined, for example, based on a relative distance between the position, which is indicated by the position data inputted from the GPS receiver 11, and the position, which is indicated by the position data retrieved from the storage 6.

When the CPU 2 determines that there is the continuity between the position data inputted from the GPS receiver 11 and the position data retrieved from the storage 6 ("YES" at step S4), the orientation data of is inputted to the CPU 2 from the geomagnetic sensor 12 (step S5). Also, the orientation data is inputted to the CPU 2 from the gyro sensor 13 (step S6). Furthermore, the distance data is inputted to the CPU 2 from the distance sensor 14 (step S7). Then, the position data inputted from the GPS receiver 11, the position data retrieved from the storage 6, the orientation data inputted from the geomagnetic sensor 12, the orientation data inputted from the gyro sensor 13 and the distance data inputted from the distance sensor 14 are complemented each other to determine the current vehicle position (step S8).

On the other hand, when the CPU 2 detects that there is no continuity between the position data inputted from the GPS receiver 11 and the position data retrieved from the storage 6 ("NO" at step S4), the CPU 2 determines whether the wireless communication link is established between the car navigation system 1 and the PDA 18 (step S9). When the car navigation system 1 and the PDA 18 are located close to each other, and it is determined that the wireless communication link is established between the car navigation system 1 and the PDA 18 ("YES" at step S9), the CPU 2 transmits a position data transmission request signal through the Bluetooth communication device 10 of the car navigation system 1 to the Bluetooth communication device 25 of the PDA 18 (step S10). Then, the CPU 2 waits transmission of the position data from the PDA 18 for a predetermined time period, e.g., 10 seconds (steps S11 and S12).

In the PDA 18, the CPU 19 determines whether the wireless communication link is established between the car navigation system 1 and the PDA 18 (step T1). When the CPU 19 detects that the wireless communication link is established between the car navigation system 1 and the PDA 18 ("YES" at step T1), the CPU 19 determines whether the data transmission request signal is received from the car navigation system 1 through the Bluetooth communication device 25 (step T2). When the CPU 19 detects that the position data transmission request signal is received from the car navigation system 1 through the Bluetooth communication device 25 ("YES" at step T2), the CPU 19 retrieves the position data stored in the position data storage 24 (step T3). Then, the CPU 19 transmits the position data retrieved from the position data storage 24 to the car navigation system 1 through the Bluetooth communication device 25 (step T4).

Then, in the car navigation system 1, when the CPU 2 detects that the position data is received from the PDA 18 through the Bluetooth communication device 10 before elapse of the predetermined time period ("YES" at step S11), the CPU 2 determines whether there is continuity between the position data inputted from the GPS receiver 11 and the position data received from the PDA 18 (step S13).

Then, when the CPU 2 detects that there is continuity between the position data inputted from the GPS receiver 11 and the position data received from the PDA 18 ("YES" at step S13), the orientation data is inputted to the CPU 2 from the geomagnetic sensor 12 (step S5). Also, the orientation data is inputted to the CPU 2 from the gyro sensor 13 (step S6). Furthermore, the distance data is inputted to the CPU 2 from the distance sensor 14 (step S7). Then, the position data inputted from the GPS receiver 11, the position data received from the PDA 18, the orientation data inputted from the geomagnetic sensor 12, the orientation data inputted from the gyro sensor 13 and the distance data inputted from the distance sensor 14 are complemented each other to determine the current vehicle position (step S8).

When the CPU 2 detects that there is no continuity between the position data inputted from the GPS receiver 11 and the position data received from the PDA 18 ("NO" at step S13), the CPU 2 does not further determine the current vehicle position, and control returns to step S1.

With the above control operation, when there is no continuity between the current position data acquired by the GPS receiver 11 and the position data stored in the storage 6, i.e., the previous position data previously acquired by the GPS receiver 11, and thus it is difficult to determine the current vehicle position with use of the previously acquired position data previously acquired by the GPS receiver 11, the CPU 2 receives position data from the PDA 18 by transmitting the data transmission request signal to the PDA 18. Then, if there is continuity between the position data acquired by the GPS receiver 11 and the position data received from the PDA 18, the current vehicle position can be determined with use of the position data received from the PDA 18.

Figure 4:
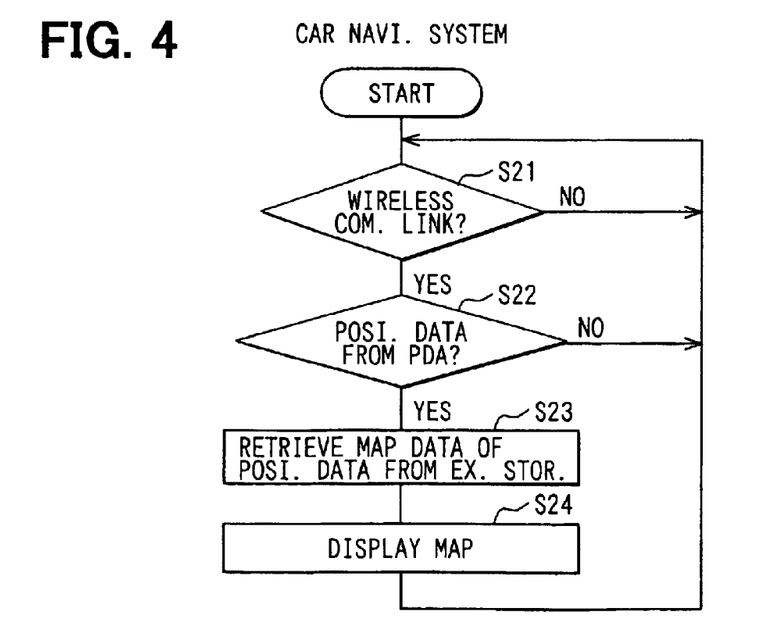
FIG. 4 is a flowchart showing a control operation of the car navigation system for displaying a map of map data corresponding to position data according to the first embodiment.
Figure 5:
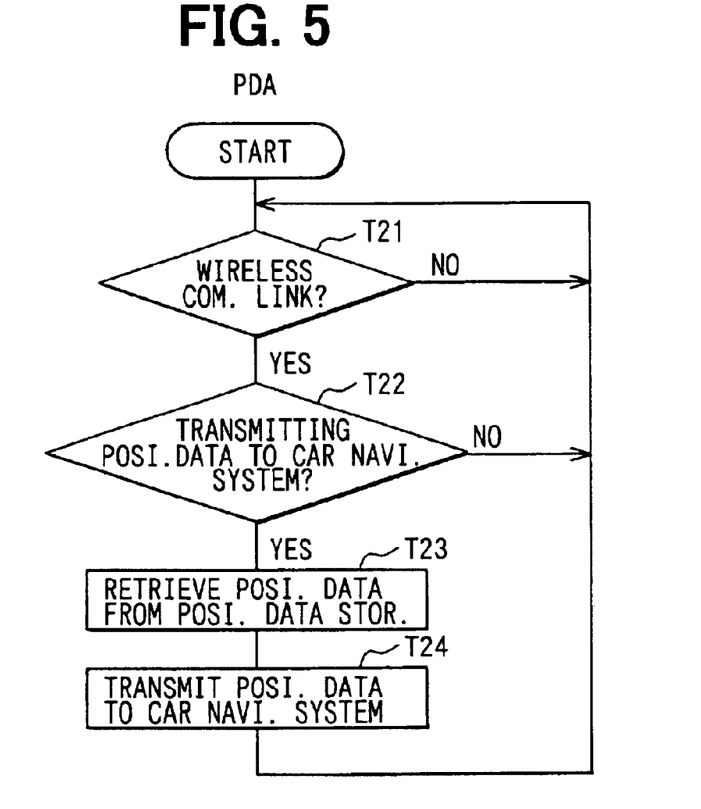
FIG. 5 is a flowchart showing a control operation of the PDA for transmitting the position data to the car navigation system according to the first embodiment.

Then, the display operation for displaying a map of map data, which corresponds to the position data received from the PDA 18, on the display 16 of the car navigation system 1 will be described with reference to FIGS. 4 and 5. FIG. 4 shows a flow chart indicating a corresponding control operation of the car navigation system 1. FIG. 5 shows a flowchart indicating a corresponding control operation of the PDA 18.

In the PDA 18, the CPU 19 determines whether the wireless communication link is established between the PDA 18 and the car navigation system 1 (step T21). When the CPU 19 detects that the wireless communication link is established between the PDA 18 and the car navigation system 1 ("YES" at step T21), the CPU 19 determines whether the operating key device 20 has been operated by the user to transmit the position data to the car navigation system 1 (step T22).

When the CPU 19 detects that the operating key device 20 has been operated by the user to transmit the position data to the car navigation system 1 ("YES" at step T22), the CPU 19 retrieves the position data stored in the position data storage 24 (step T23). Then, the CPU 19 transmits the position data retrieved from the position data storage 24 to the car navigation system 1 through the Bluetooth communication device 25 (step T24).

In the car navigation system 1, the CPU 2 determines whether the wireless communication link is established between the car navigation system 1 and the PDA 18 (step S21). When the CPU 2 detects that the wireless communication link is established between the car navigation system 2 and the PDA 18 ("YES" at step S21), the CPU 2 determines whether the position data is received from the PDA 18 through the Bluetooth communication device 10 (step S22). When the CPU 2 detects that the position data is received from the PDA 18 through the Bluetooth communication device 10 ("YES" at step S22), map data, which corresponds to the position data received from the PDA 18, is retrieved from an external storage medium, such as the CD-ROM, through the data input device 4 (step S23). Then, the CPU 2 displays the map corresponding to the retrieved map data, on the display 16 (step S24).

With the above control operation, in the car navigation system 1, when the position data is received from the PDA 18, the map data, which corresponds to the received position data, is retrieved from the external storage medium, such as the CD-ROM, through the data input device 4, and the map, which corresponds to the retrieved map data, is displayed on the display 16.

As described above, according to the first embodiment of the present invention, in the car navigation system 1, when the position data is received from the PDA 18, the current vehicle position is determined based on the received position data. Thus, even if there is no continuity between the current position data acquired by the car navigation system 1 and the previous position data previously acquired by the car navigation system 1, the position data, which can complement the position data of a blank period between the current position data of the car navigation system 1 and the previous position data of the car navigation system 1, is acquired by the PDA 18 and is then transmitted to the car navigation system 1. As a result, the position data of the blank period is complemented with the position data acquired by the PDA 18, and thus the current vehicle position can be quickly determined, thereby improving the usability of the car navigation system 1.

Furthermore, in the car navigation system 1, when the position data is received from the PDA 18, the map of the map data, which corresponds to the received position data, is displayed on the display 16. Thus, the desired position data is acquired through the PDA 18 and is then transmitted to the car navigation system 1, so that the map of the map data, which corresponds to the desired position data acquired by the PDA 18, is displayed on the display 16, thereby improving the usability of the car navigation system 1.

Furthermore, the position data is transmitted from the PDA 18 to the car navigation system 1 through the wireless communication link. Thus, the PDA 18 and the car navigation system 1 are linked together without needs for a physical connection, such as a communication cable, between the PDA 18 and the car navigation system 1, allowing a higher degree of freedom in respect of positioning of the PDA 18.

Furthermore, the GPS receiver 23 of the PDA 18 includes the autonomous positioning type GPS sensor 27, which carries out the GPS positioning by itself based on the GPS signals transmitted from the GPS satellites 15. Thus, unlike a GPS receiver that has a network-assisted positioning type GPS sensor, which carries out the GPS positioning with aid of network assistance, communication of correction data, which is required to acquire the position data, between the GPS receiver and a positioning server is not required. As a result, an extra cost for communicating data between the GPS receiver and the positioning server for acquiring the correction data to obtain the position data is not required.

(Second Embodiment)

A second embodiment of the present invention will be described with reference to FIG. 6. Components similar to those discussed with reference to the first embodiment will be indicated with similar numerals and will not be discussed further. The following discussion is mainly focused on differences between the second embodiment and the first embodiment.

In the above first embodiment, the GPS receiver 23 of the PDA 18 includes the autonomous positioning type GPS sensor 27, which carries out the GPS positioning by itself based on the GPS signals transmitted from the GPS satellites 15. Contrary to this, in the second embodiment, a GPS receiver (position data acquiring means) 32 of a PDA 31 includes a network-assisted positioning type GPS sensor 33, which carries out the GPS positioning with aid of network assistance based on the GPS signals transmitted from the GPS satellites 15.

Figure 6:
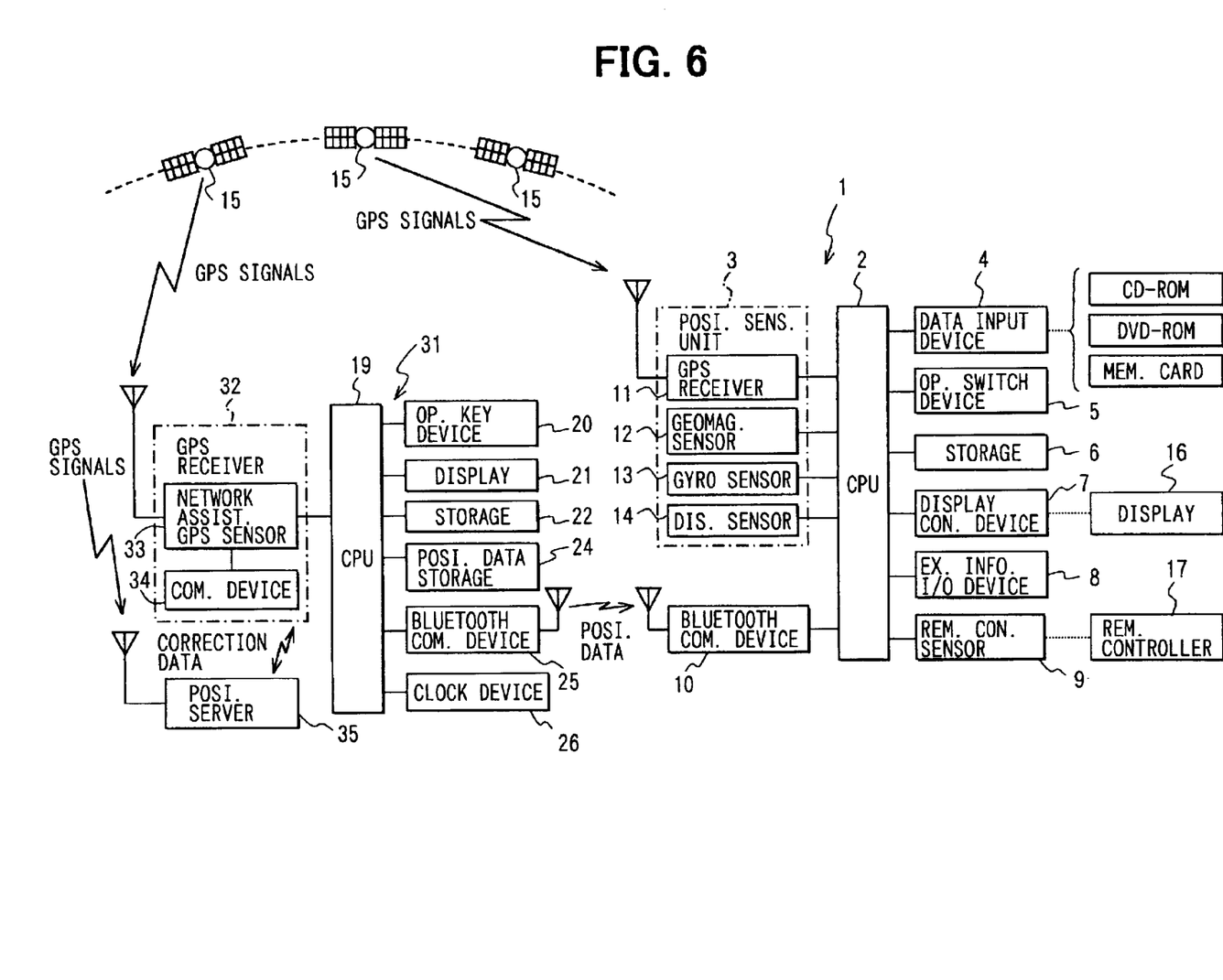
FIG. 6 is a functional block diagram showing a second embodiment of the present invention.

That is, in the PDA 31 shown in FIG. 6, the GPS receiver 32 includes the network-assisted positioning type GPS sensor (network-assisted positioning type GPS positioning means) 33 and a communication device 34. The network-assisted positioning type GPS sensor (also referred to as a network-assisted GPS sensor) 33 is the sensor that acquires position data when the communication device 34 communicates with a positioning server 35 to communicate correction data. In this instance, because of the network assistance, the network-assisted positioning type GPS sensor 33 can achieve higher signal sensitivity in comparison to the autonomous positioning type GPS sensor 27 of the first embodiment.

As described above, according to the second embodiment, advantages similar to those discussed in the first embodiment can be achieved. Furthermore, the GPS receiver 32 of the PDA 31 includes the network-assisted positioning type GPS sensor 33, which carries out the GPS positioning with aid of the network assistance based on the GPS signals transmitted from the GPS satellites 15. Thus, in comparison to the GPS receiver 23 of the first embodiment, which includes the autonomous positioning type GPS sensor 27, the higher signal sensitivity is achieved by communicating the correction data, which is required to acquire the position data, between the GPS receiver 23 and the positioning server 35. As a result, it is possible to appropriately acquire the position data even in a weak GPS signal range.

(Third Embodiment)

A third embodiment of the present invention will be described with reference to FIGS. 7 to 11. Components similar to those discussed with reference to the first embodiment will be indicated with similar numerals and will not be discussed further. The following discussion is mainly focused on differences between the third embodiment and the first embodiment.

In the third embodiment, the CPU 19 of the PDA 18 stores a plurality of sets of the position data in the position data storage 24 in a manner discussed below. That is, when the CPU 19 detects that a key operation for storing each set of the position data is carried out through the operating key device 20 by the user, the set of the position data is inputted to the CPU 19 from the GPS receiver 23. At the same time, a clock signal is inputted to the CPU 19 from the clock device 26 to provide the associated date and time at which the set of the position data is inputted to the CPU 19. Then, the CPU 19 operates the display 21 to display the associated date and time of acquisition of the set of the position data (e.g., Jan. 16, 2002 13:15 in FIG. 7) as well as latitude and longitude coordinates (e.g., 34 degrees 58 minutes 38 seconds north latitude and 138 degrees 23 minutes 45 seconds east longitude in FIG. 7) indicated by the set of the position data on the display 21.

Figure 7:
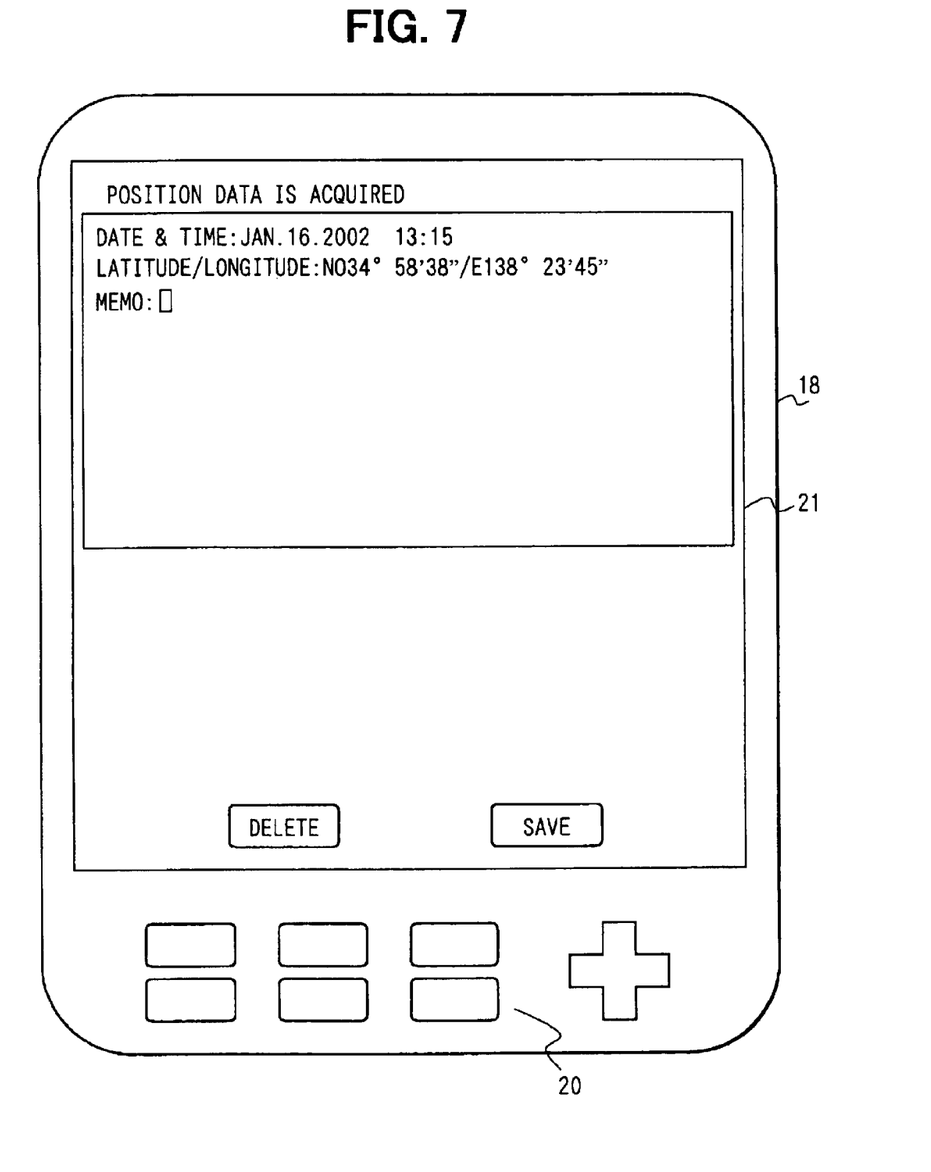
FIG. 7 is a diagram showing an exemplary display on the PDA according to a third embodiment of the present invention.
Figure 8:
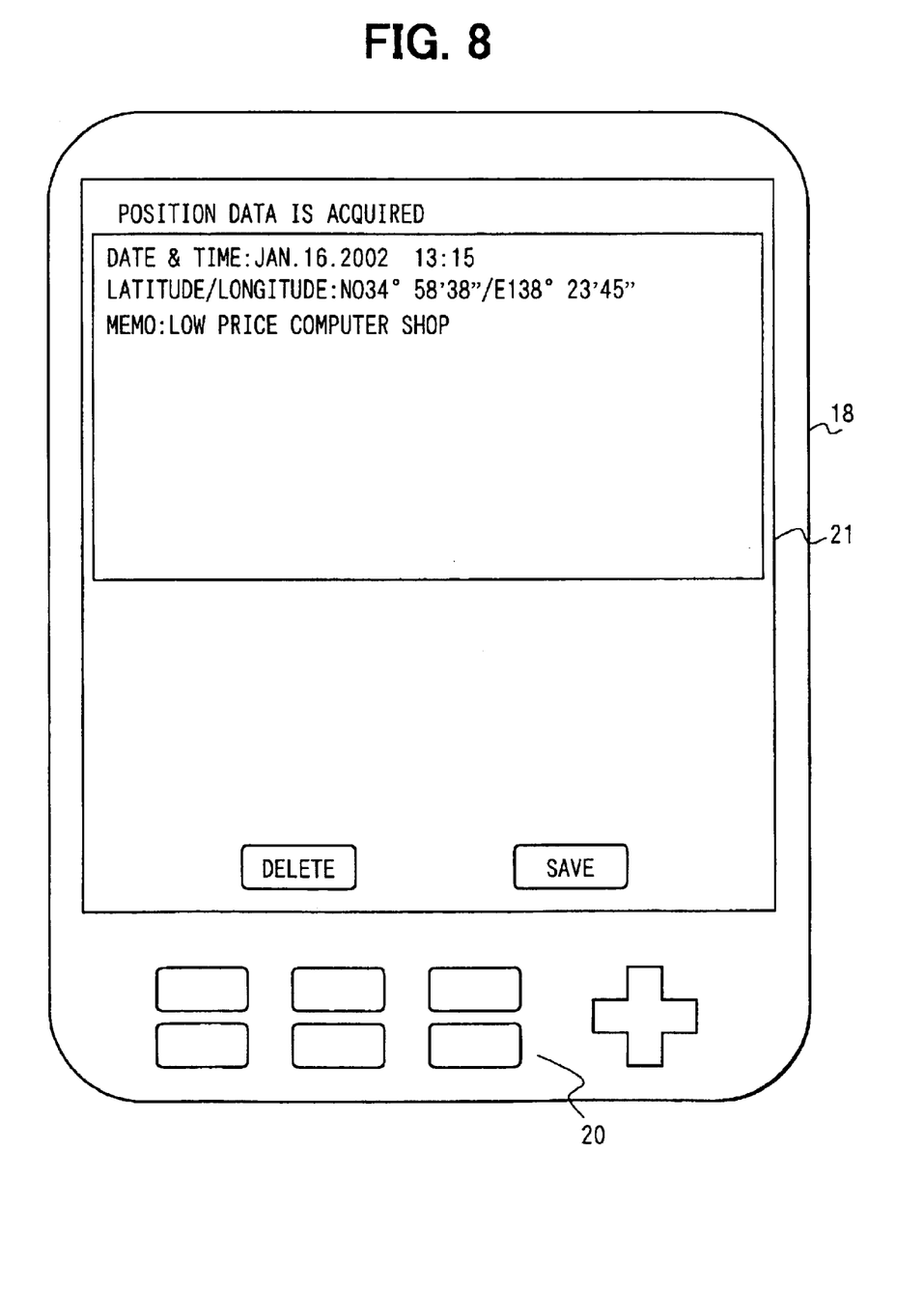
FIG. 8 is a diagram showing another exemplary display on the PDA according to the third embodiment.

At this time, the CPU 19 also controls the display 21 to display two touch keys, i.e., a "delete" key and a "save" key on the display 21. At this stage, when the CPU 19 detects activation of the "save" key, the CPU 19 stores the set of the position data and the associated date and time of acquisition of the set of the position data in the position data storage 24. On the other hand, when the CPU 19 detects activation of the "delete," key instead of the "save" key, the CPU 19 does not store the set of the position data and the associated date and time of acquisition of the set of the position data in the position data storage 24.

The CPU 19 waits for input of characters (the characters may be inputted as a memo or comments and may also include numerals) by the user through the operating key device 20. When the CPU 19 detects the input of the characters by the user through the operating key device 20, the CPU 19 controls the display 21 to display the characters (e.g., "low price computer shop" in FIG. 8). At this stage, if the CPU 19 detects activation of the "save key", the CPU 19 stores the associated characters inputted by the user in addition to the set of the position data and the associated date and time of acquisition of the set of the position data in the position data storage 24.

In this manner, the CPU 19 stores not only the set of the position data but also the associated date and time of acquisition of the set of the position data and the associated characters inputted by the user in the position data storage 24. The CPU 19 repeats the above process and thereby stores a plurality of sets of the position data, the associated dates and times and the associated characters in the position data storage 24.

Figure 9:
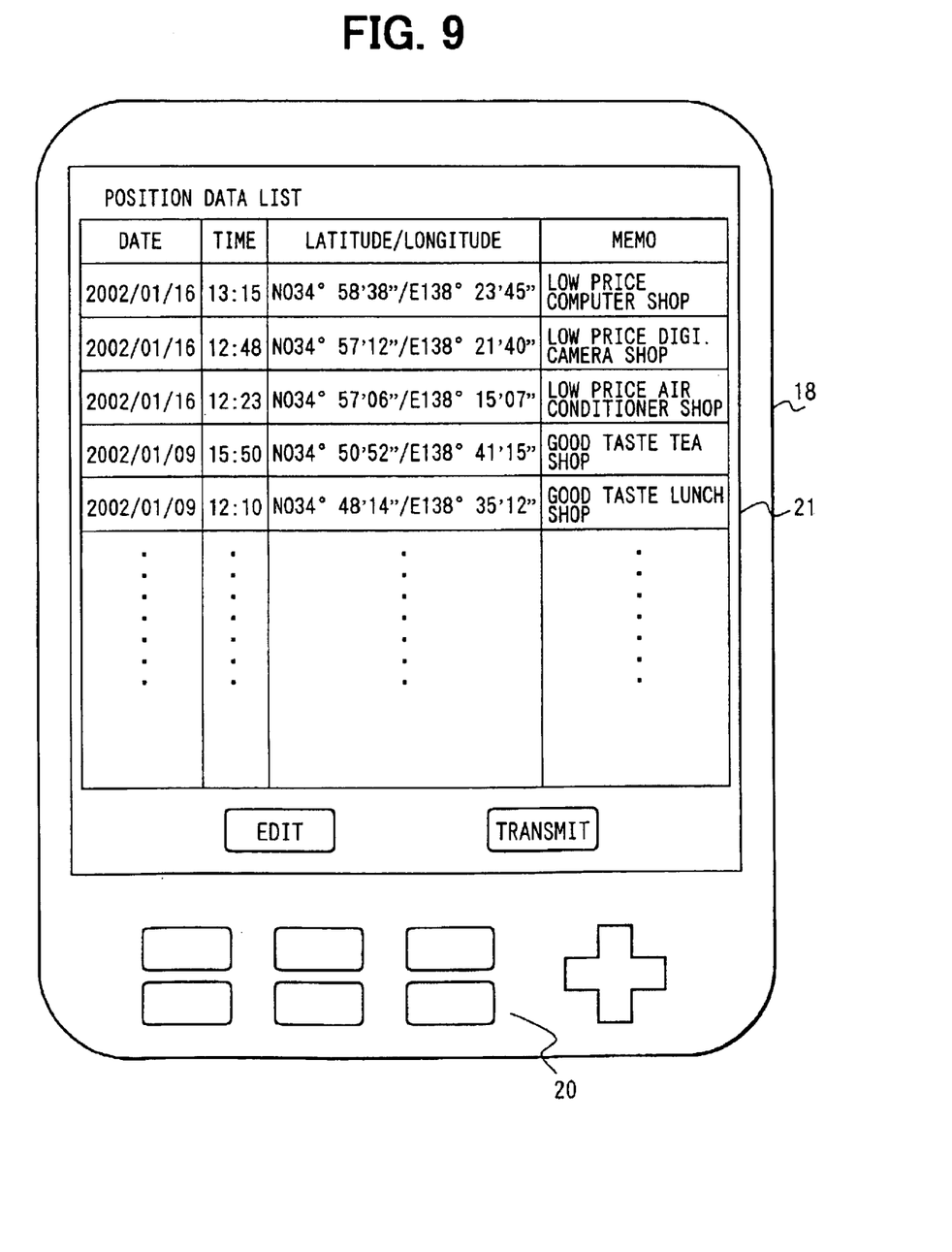
FIG. 9 is a diagram showing a further exemplary display on the PDA according to the third embodiment.

Next, when the CPU 19 detects a key operation of the operating key device 20 by the user for displaying the sets of the position data, which are stored in the position data storage 24, on the display 21, the CPU 19 retrieves the sets of the position data stored in the position data storage 24 and makes a list of the sets of the position data, the associated dates and times and the associated characters. Thereafter, the CPU 19 causes or commands the display 21 to display the list, as shown in FIG. 9.

At this time, the CPU 19 commands the display 21 to display two touch keys, i.e., an "edit" key and a "transmit" key. At this stage, if the CPU 19 detects selection of any one set of the position data and also detects activation of the "transmit" key, the CPU 19 transmits the selected set of the position data to the car navigation system 1 through the Bluetooth communication device 25.

In the above operation, at the time of selecting the particular set of the position data, the display 19 displays not only the sets of the position data but also the associated dates and times and the associated characters inputted by the user. Thus, even if the user is not familiar with any particular local area, the user can easily select any desired set of the position data by specifying the associated date and time and/or the associated characters. If the CPU 19 detects activation of the "edit" key in stead of the above "transmit" key, the CPU edits the position data based on the user key operation.

Figure 10:
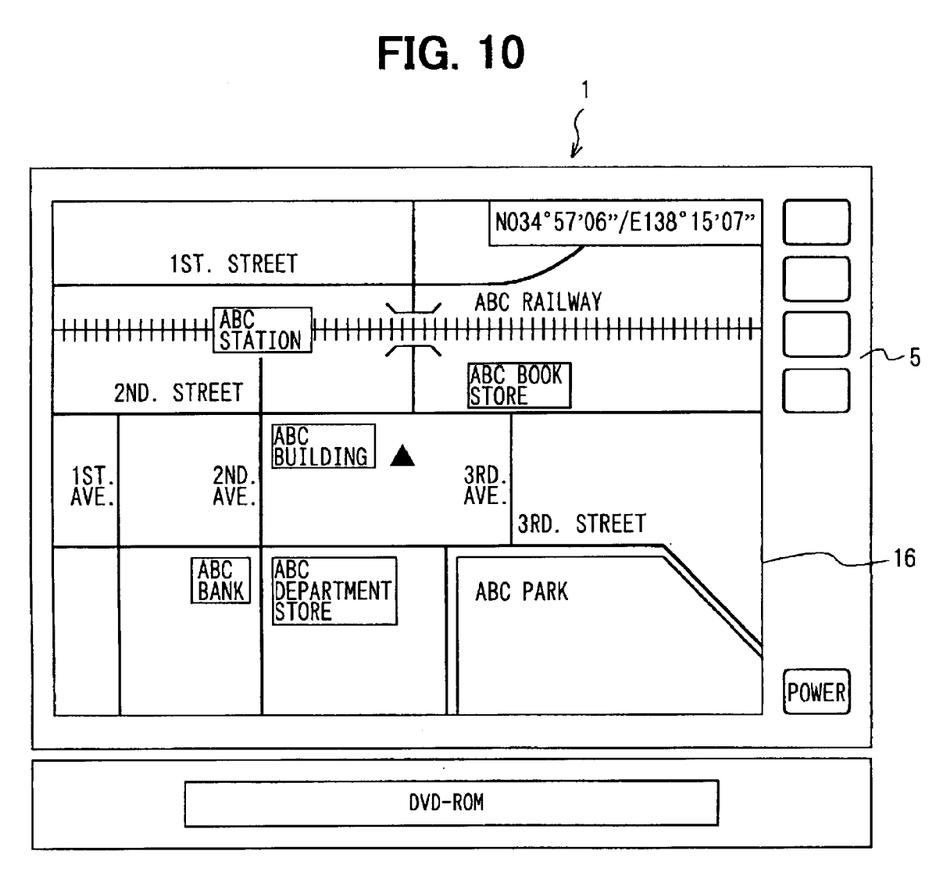
FIG. 10 is a diagram showing an exemplary display on the car navigation system according to the third embodiment.

In the car navigation system 1, when the CPU 2 detects reception of the set of the position data from the PDA 18 through the Bluetooth communication device 10, the CPU 2 retrieves map data, which corresponds to the received set of the position data, from the external storage medium, such as the CD-ROM, through the data input device 4. Then, the CPU 19 displays the map of the retrieved map data on the display 16, as shown in FIG. 10. FIG. 10 shows a case where the set of the position data, which indicates a position at 34 degrees 57 minutes 06 seconds north longitude and 138 degrees 15 minutes 07 seconds east latitude, is selected through the PDA 18, and the set of the position data is transmitted from the PDA 18 to the car navigation system 1 to display the corresponding map data showing an area around that particular position (indicated with a shaded triangle) on the display 16 of the car navigation system.

Figure 11:
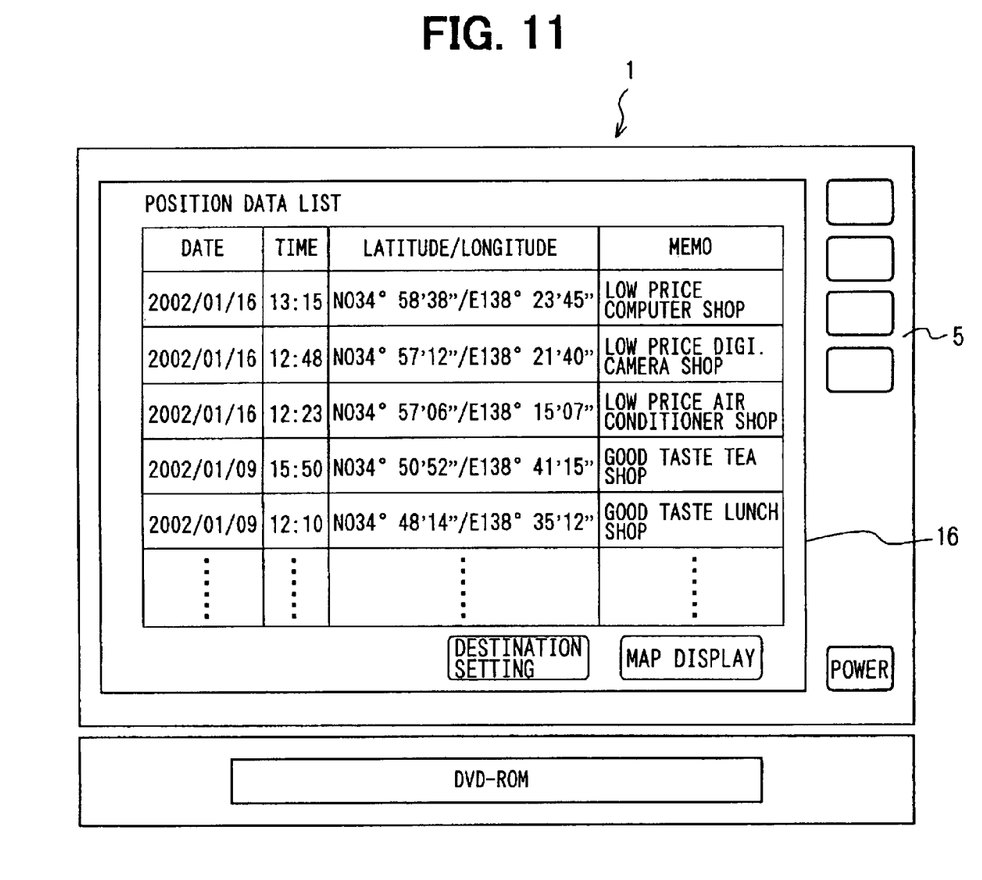
FIG. 11 is a diagram showing another exemplary display on the car navigation system according to the third embodiment.

Furthermore, in the car navigation system 1, when the CPU 2 detects reception of all sets of the position data through the Bluetooth communication device 10 from the PDA 18, the CPU 2 makes a list of all sets of the position data along with the associated dates and times and the associated characters and then commands the display 16 to displays the list, as shown in FIG. 11.

At this time, the CPU 2 commands the display 16 to display two touch keys, i.e., a "destination setting" key and a "map display" key. When the CPU 2 detects selection of one set of the position data and activation of the "map display" key, the CPU 2 retrieves the map data corresponding to the selected set of the position data from the external storage, such as the CD-ROM, through the data input device 4 and displays a map of the retrieved map data on the display 16, as shown in FIG. 10.

Here, when the user selects the one set of the position data from the sets of the position data, the display 16 displays the sets of the position data, the associated dates and times and the associated characters inputted by the user. Thus, even if the user is not familiar with that particular local area, the user can easily select the desired set of the position data by specifying the associated date and time and/or the associated characters of the desired set of the position data.

As described above, according to the third embodiment, in the PDA 18, the sets of the position data obtained through the GPS receiver 23 and the associated dates and times are stored in the position data storage 24. Then, when the associated date and time of the desired set of the position data are specified by the user, the desired set of the position data corresponding to the associated date and time is transmitted from the PDA 18 to the car navigation system 1. Thus, as long as the associated date and time of the desired set of the position data are stored in the position data storage 24, the user can transmit the desired set of the position data from the PDA 18 to the car navigation system 1 even in the area where the user is not familiar with by specifying the associated date and time of the desired set of the position data. Then, the map of the map data corresponding to the desired set of the position data can be displayed on the display 16 of the car navigation system 1.

Furthermore, in the PDA 18, the sets of the position data obtained through the GPS receiver 23 are stored in the position data storage 24 together with the associated characters inputted by the user. When the associated characters are specified by the user, the corresponding set of the position data is transmitted from the PDA 18 to the car navigation system 1. Thus, as long as the associated characters (a memo or comments) of the desired set of the position data are stored in the position data storage 24, the user can transmit the desired set of the position data from the PDA 18 to the car navigation system 1 even in the area where the user is not familiar with by specifying the associated characters of the desired set of the position data. Then, the map of the map data corresponding to the desired set of the position data can be displayed on the display 16 of the car navigation system 1.

The invention is not limited to the above embodiments, and the above embodiments can be modified as follows.

The hand-held terminal is not limited to the PDA and can be a mobile phone, a palm-sized computer or the like.

The above arrangement can be modified such that the position data is transmitted from the PDA to the car navigation system upon corresponding operation of the operating switch device or the remote controller of the car navigation system.

The communication devices, which establish the wireless communication link between the PDA and the car navigation system, are not limited to those that conform to the Bluetooth wireless communication standard. The communication devices can be those that establish an infrared wireless communication link, a wireless local area network (wireless LAN) link or the like between the PDA and the car navigation system. Furthermore, the communication devices are not limited to those that establish the wireless communication link between the PDA and the car navigation system and can be those that establish a wire communication link between the PDA and the car navigation system.

The position sensing unit of the car navigation system is not limited to the above unit, which includes the GPS receiver, the geomagnetic sensor, the gyro sensor and the distance sensor. The position sensing unit can have any other sensor (s) in addition to or instead of the above sensors.

The control programs for executing the above operations need not be initially installed (for example, at a manufacturing process) in the corresponding storage of the PDA and in the corresponding storage of the car navigation system. For example, the control programs can be downloaded to and installed in the PDA and the car navigation system from a particular server through a communication network. Alternatively, the control programs can be installed in the PDA and the car navigation system from an external storage device, such as a memory card.

Additional advantages and modifications will readily occur to those skilled in the art. The invention in its broader terms is therefore, not limited to the specific details, representative apparatus, and illustrative examples shown and described.

What is claimed is:

1. A navigation system for a vehicle, the navigation system comprising:

a position data receiving means for receiving at least one set of position data from a hand-held terminal, wherein each of the at least one set of position data indicates a corresponding position of the hand-held terminal;

a position data acquiring means for acquiring successive sets of position data based on a GPS signal transmitted from at least one GPS satellite, wherein each of the successive sets of position data indicates a corresponding position of the vehicle; and a control means that executes at least one predetermined process based on at least one of the successive sets of the position data, which are acquired by the position data acquiring means, wherein:

the control means checks existence of the continuity between a current set of position data and the previous set of position data, both of which are acquired by the position data acquiring means at a predetermined interval;

when the control means determines that the continuity between the current set of position data and the previous set of position data, both of which are acquired by the position data acquiring means, exists, the control means determines a current position of the vehicle based on the current set of position data and the previous set of position data, both of which are acquired by the position data acquiring means, and when the control means determines that the continuity between the current set of position data and the previous set of position data, both of which are acquired by the position data acquiring means, does not exist, the control means uses the current set of position data, which is acquired by the position data acquiring means, and one of the at least one set of position data, which is received from the hand-held terminal, only upon existence of continuity between the current set of position data, which is acquired by the position data acquiring means, and the one of the at least one set of position data, which is received from the hand-held terminal.

2. The navigation system according to claim 1, wherein:

the control means checks the existence of the continuity between the current set of position data and the previous set of position data, both of which are acquired by the position data acquiring means, based on a relative distance between the position of the vehicle, which is indicated by the current set of position data, and the position of the vehicle, which is indicated by the previous set of position data; and the control means determines the existence of the continuity between the current set of position data, which is acquired by the position data acquiring means, and the one of the at least one set of position data, which is received from the hand-held terminal, based on a relative distance between the position of the vehicle, which is indicated by the current set of position data, and the position of the hand-held terminal, which is indicated by the one of the at least one set of position data.

3. The navigation system according to claim 1, further comprising a display means, wherein the control means controls the display means to display a map of map data that corresponds to at least one of the at least one set of position data, which is received from the hand-held terminal.

4. The navigation system according to claim 1, wherein the position data receiving means receives the at least one set of position data from the hand-held terminal through wireless communication.

5. The navigation system according to claim 1, wherein the control means determines that the continuity between the current set of position data and the previous set of position data, both of which are acquired by the position data acquiring means, exists when a distance between the position of the vehicle, which is indicated by the current set of position data, and the position of the vehicle, which is indicated by the previous set of position data, is equal to or less than a predetermined amount.

6. The navigation system according to claim 1, wherein the predetermined interval is a predetermined distance.

7. The data transfer system comprising a hand-held terminal and a navigation system, wherein:

the hand-held terminal includes:

a position data acquiring means for acquiring at least one set of position data, wherein each of the at least one set of position data indicates a corresponding position of the hand-held terminal, and the position data acquiring means includes a network-assisted positioning type GPS positioning means for performing GPS positioning with aid of network assistance based on a GPS signal transmitted from at least one GPS satellite;

a position data transmitting means for transmitting the at least one set of position data, which is acquired by the position data acquiring means; and a control means that transmits the at least one set of position data, which is acquired by the position data acquiring means, from the position data transmitting means to the navigation system;

the navigation system is for a vehicle and includes:
- a position data receiving means for receiving the at least one set of position data from the hand-held terminal;
- a position data acquiring means for acquiring successive sets of position data based on a GPS signal transmitted from at least one GPS satellite, wherein each of the successive sets of position data, which are acquired by the position data acquiring means of the navigation system, indicates a corresponding position of the vehicle; and
- a control means that executes at least one predetermined process based on at least one of the successive sets of the position data, which are acquired by the position data acquiring means of the navigation system;

the control means of the navigation system checks existence of continuity between a current set of position data and a previous set of position data, both of which are acquired by the position data acquiring means of the navigation system at a predetermined interval;

when the control means of the navigation system determines that the continuity between the current set of position data and the previous set of position data, both of which are acquired by the position data acquiring means of the navigation system, exists, the control means of the navigation system determines a current position of the vehicle based on the current set of position data and the previous set of position data, both of which are acquired by the position data acquiring means of the navigation system; and when the control means of the navigation system determines that the continuity between the current set of position data and the previous set of position data, both of which are acquired by the position data acquiring means of the navigation system, does not exist, the control means of the navigation system uses the current set of position data, which is acquired by the position data acquiring means of the navigation system, and one of the at least one set of position data, which is acquired by the position data acquiring means of the hand-held terminal, only upon existence of continuity between the current set of position data, which is acquired by the position data acquiring means of the navigation system, and the one of the at least one set of position data, which is acquired by the position data acquiring means of the hand-held terminal.

8. The data transfer system according to claim 7, wherein:
the control means of the navigation system checks the existence of the continuity between the current set of position data and the previous set of position data, both of which are acquired by the position data acquiring means of the navigation system, based on a relative distance between the position of the vehicle, which is indicated by the current set of position data, and the position of the vehicle, which is indicated by the previous set of position data; and the control means of the navigation system determines the existence of the continuity between the current set of position data, which is acquired by the position data acquiring means of the navigation system, and the one of the at least one set of position data, which is acquired by the position data acquiring means of the hand-held terminal, based on a relative distance between the position of the vehicle, which is indicated by the current set of position data, and the position of the hand-held terminal, which is indicated by the one of the at least one set of position data.

9. The data transfer system according to claim 7, wherein:
the navigation system further includes a display means; and the control means of the navigation system controls the display means to display a map of map data that corresponds to at least one of the at least one set of position data, which is acquired by the position data acquiring means of the hand-held terminal.

10. The data transfer system according to claim 7, wherein the position data receiving means of the navigation system receives the at least one set of position data from the position data transmitting means of the hand-held terminal through wireless communication.

11. The data transfer system according to claim 7, wherein the control means of the navigation system determines that the continuity between the current set of position data and the previous set of position data, both of which are acquired by the position data acquiring means of the navigation system, exists when a distance between the position of the vehicle, which is indicated by the current set of position data, and the position of the vehicle, which is indicated by the previous set of position data, is equal to or less than a predetermined amount.

12. The data transfer system according to claim 7, wherein the predetermined interval is a predetermined distance.

* * * * *